(12) United States Patent
Haglöf

(10) Patent No.: US 7,451,552 B2
(45) Date of Patent: Nov. 18, 2008

(54) ELECTRONIC MEASURING TAPE

(75) Inventor: Stefan Haglöf, Helgum (SE)

(73) Assignee: Haglof Sweden AB, Langsele (SE)

( * ) Notice: Subject to any disclaimer, the term of this patent is extended or adjusted under 35 U.S.C. 154(b) by 28 days.

(21) Appl. No.: 11/819,376

(22) Filed: Jun. 27, 2007

(65) Prior Publication Data

US 2008/0120863 A1   May 29, 2008

(30) Foreign Application Priority Data

Jun. 27, 2006  (SE) .................................. 0601399

(51) Int. Cl.
*G01B 3/10*  (2006.01)
(52) U.S. Cl. .............................. 33/762; 33/756; 33/767
(58) Field of Classification Search .................. 33/762, 33/756, 763, 555.4
See application file for complete search history.

(56) References Cited

U.S. PATENT DOCUMENTS

| | | | |
|---|---|---|---|
| 3,170,240 A * | 2/1965 | Collins ........................ 33/763 |
| 4,037,326 A * | 7/1977 | Booth et al. ................... 33/756 |
| 4,532,709 A * | 8/1985 | Leumann et al. ............... 33/763 |
| 4,587,738 A * | 5/1986 | Kang ........................... 33/762 |
| 5,774,999 A * | 7/1998 | Smith ........................ 33/555.4 |
| 6,154,975 A * | 12/2000 | Steinich ........................ 33/756 |
| 6,234,061 B1 * | 5/2001 | Glasson ........................ 92/5 R |
| 6,658,755 B2 * | 12/2003 | Arlinsky ....................... 33/760 |
| 6,868,620 B2 * | 3/2005 | Sanoner ........................ 33/763 |
| 7,197,974 B2 * | 4/2007 | Glasson ........................ 92/5 R |
| 2006/0025706 A1 * | 2/2006 | Chen ........................... 600/587 |

* cited by examiner

*Primary Examiner*—Christopher W Fulton
(74) *Attorney, Agent, or Firm*—Young & Thompson

(57) ABSTRACT

An electronic measuring tape that includes a roller onto which the measuring tape is arranged to be wound up onto and wound out from through the roller being rotated, a first end of the measuring tape is attached in the roller, and where the roller is located inside a housing. A rolled up measuring tape is arranged in loops on the roller. All loops are in direct contact with the surface of the roller, an angle sensor is arranged at the roller to record an angle of rotation during rotation of the roller. An electronic circuit converts the angle of rotation into a length that corresponds to the length by which the measuring tape has been withdrawn from the housing, and the measuring tape records absolute values.

20 Claims, 2 Drawing Sheets

ELECTRONIC MEASURING TAPE

Figure 1:
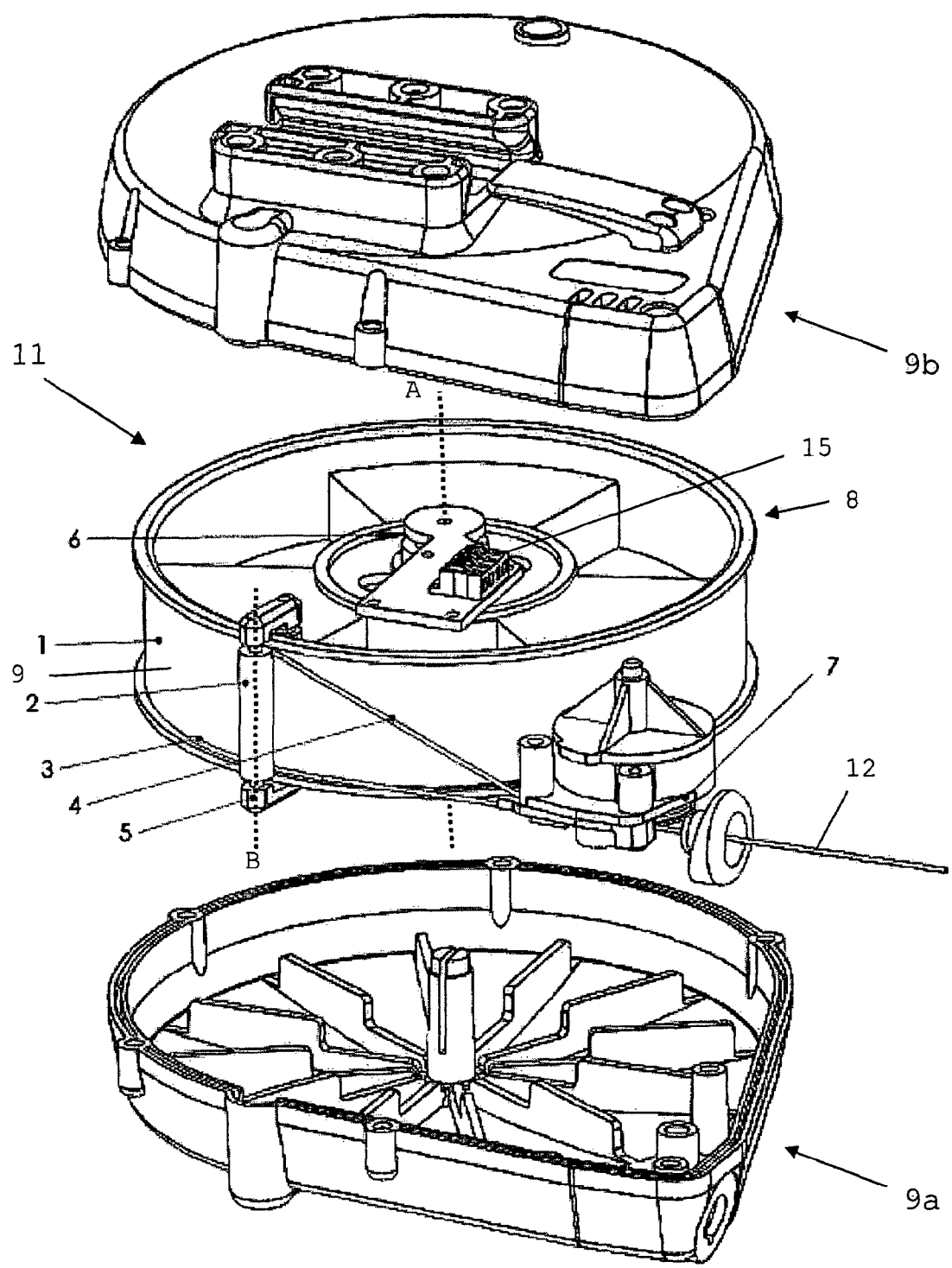

The present invention relates to a measuring tape that can be used for several purposes, with advantage for the measurement of trees and logs within the forestry industry, such as during the measurement of the diameter or the length of trees or logs.

The measuring tapes that are used today are analogue tapes. Furthermore, measurement with the majority of the measuring tapes takes place manually. Measurement is carried out through a first end of the measuring tape being placed at a first position, from which it is desired that measurement should take place. The measuring tape is subsequently drawn to a second position to which it is desired that measurement should take place. A length is manually read off from the measuring tape at the second position.

Electronic measuring tapes that are provided with holes are known. A number of light-emitting diodes illuminate through a number of holes that are located along a vernier scale. Thus, electronic registration takes place in this manner. The holes make such measuring tapes unsuitable to be used in the environment that is prevalent in the forest.

It is desired in many areas of application that the registered measurement values are stored in a computer for the processing of input data in the computer.

A number of sources of error arise during the measurement, as the measurement procedure has been described above. One source of error can be that the reading is erroneously made, in that the person who carries out the measurement is to read the measuring tape manually. Furthermore, it may be so that a number of readings are to be taken by the same person, and this may contribute to the concentration of the person who carries out the measurement becoming poor, with the risk then that erroneous reading takes place. A further source of error is that the wrong measured values may be fed into the computer to be processed as input data.

Within the forestry industry, for example, many measurements are carried out not only on trees that are standing in the forest, for example the diameter of a tree, but also on fallen trees that remain lying in the forest. Trees are normally felled in the forest now using machines known as "harvesters". A harvester grips the tree low down on its trunk and saws through the tree below the point of gripping. The tree is subsequently rotated to the horizontal position, after which the tree is limbed by being driven by rotating wheels through a limbing station. Once the tree has been fed forward a certain distance, the tree is sawn through by means of a chain saw mounted at the limbing station. The tree trunk is then fed a certain distance further forwards while the limbing takes place, after which the trunk is sawn through, etc., until the complete trunk has been limbed and sawn.

The length is measured during the forward feed of the tree by means of rollers that are in contact with the tree trunk and that are provided with protruding pegs in order to prevent slippage against the tree. The pegs penetrate to different depths into the bark or wood depending on the outdoor temperature, the presence of snow or ice, etc., and this means that the effective diameter of the rollers varies. This leads to the possibility that a measurement error may arise at the limbing station. For this reason, the sawn up logs must be measured manually by a lumberjack in order to calibrate the measurement arrangement. This takes place manually using the measuring tape.

It is very important that the complete length of the log is correctly measured by means of the measuring tape in order to carry out the said calibration correctly. If this is not done, logs with erroneous lengths relative to what has been ordered will be produced. It is, furthermore, important that the measurements of diameter take place at the correct locations in order to determine the correct conicity.

It is thus normally required that the diameter of a tree is measured for trees that are standing in the forest, and that the length and diameter are measured for logs that remain in the forest after a tree having first been felled, then limbed and sawn into pre-defined lengths.

The present invention solves these problems.

The present invention thus relates to an electronic measuring tape that comprises a roller, on which roller it is arranged that the measuring tape be rolled up onto and rolled out from by the rotation of the roller, a first end of the measuring tape being attached to the roller, and where the roller is located in a housing, and the invention is characterised in that a rolled up measuring tape is arranged in loops on the roller, of which all loops are in direct contact with the surface of the roller, in that an angle sensor is arranged at the roller arranged to record an angle of rotation during the rotation of the roller, and in that an electronic circuit is arranged to convert the said angle of rotation into a length that corresponds to the length by which the measuring tape has been withdrawn from the said housing, and in that the measuring tape records absolute values.

Figure 2:
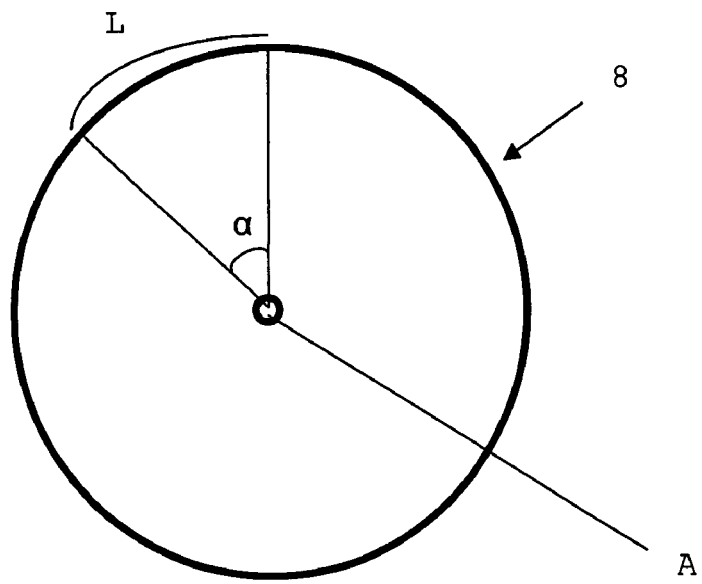
Figure 3:
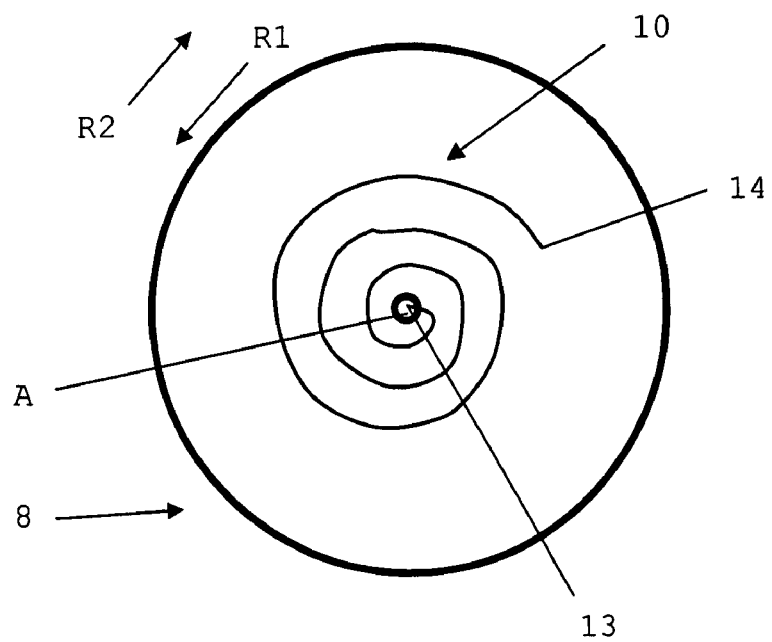

FIG. 1 shows an electronic measuring tape 11 that has been taken apart, comprising two housing parts 9a, 9b and a roller 8, on which a measuring tape 12 is wound up onto and rolled out from;

FIG. 2 shows the roller 8 schematically along the axial direction A;

FIG. 3 shows the roller 8 schematically along the axial direction A with a spring 10 between the roller 8 and the housing 9b.

The present invention thus relates to an electronic measuring tape 11 that comprises a roller 8 onto which roller 8 the measuring tape 12 is arranged to be wound up onto and wound out from, through the roller 8 being rotated. A first end 3 of the measuring tape 12 is attached to the roller 8. The roller 8 is located in a housing 9a, 9b.

FIG. 1 shows a wound-up measuring tape 12 according to the invention, arranged in loops (not shown in FIG. 1) on the roller 8. All loops are in direct contact with the surface 1 of the roller 8. An angle sensor 6 is arranged at the roller 8, arranged to record the angle of rotation a during the rotation of the roller 8, see FIG. 2. An electronic circuit 15 is arranged to convert the said angle of rotation a to a length L, corresponding to the length of the measuring tape 12 that has been withdrawn from the said housing 9a, 9b, and the measuring tape 12 measures absolute values.

The circuit 15 is arranged to transfer the length L of the measuring tape 12 that has been withdrawn to a hand-held computer with a display on which the withdrawn length, and other information, can be displayed. The measuring tape 12 may be connected to the hand-held computer through, for example, the measuring tape 12 being connected directly to the hand-held computer. A second example is that the measuring tape 12 may also be connected to the computer through a cable. The measuring tape 12 can, however, be connected to the hand-held computer in a wireless manner.

The roller 8 is provided with a spring 10 that is in a resting position when the measuring tape 12 is in a wound-up position on the roller 8, and which spring 10 is under tension when the measuring tape 12 is unwound, see FIG. 3. According to one preferred embodiment, the spring 10 is a spiral spring with a first end 13 attached at the axle A of the roller 8, with spirals that increase in diameter at increasing distance from the axis A of the roller 8. The second end 14 of the spiral spring is attached to the housing 9b. When the roller 8 is rotated in a first direction R1, the spring 10 is placed under tension and the measuring tape 12 is unwound. When the roller 8 is rotated in the opposite direction R2, tension is removed from the spring 10, to finally reach a resting position, and the measuring tape 12 is wound up.

According to one preferred embodiment, the angle sensor 6 is a magnetic angle sensor that depends on rotation. Magnetic angle sensors that depend on rotation are in themselves known, and the magnet may be of various types, for example, a diametrically polarised magnet.

According to one preferred embodiment, the angle sensor 6 comprises an existing disk that has been magnetised along a line parallel to the said axle A with the south pole and the north pole located at opposite ends of a diameter. Furthermore, the angle sensor 6 comprises a sensor disk that lies concentric with the said disk, which sensor disk comprises four sensors that are sensitive to magnetic fields located equidistantly around the periphery of the sensor disk. Furthermore, there is an electronic circuit 15 that is arranged to receive pulses from the sensor disk. The electronic circuit 15 is arranged to count upwards and downwards when the measuring tape 12 is withdrawn from and retracted into the housing 9a, 9b, respectively, whereby the electronic measuring tape 11 measures absolute values.

In this way, no setting of the zero position is required at the start of the measuring process: the electronic circuit 15 converts the rotation of the angle sensor 6 to the length of measuring tape 12 that has been withdrawn.

The magnetic field changes when the magnet is rotated, a phenomenon that is known for the angle sensor 6. An example of a supplier of such angle sensors is AMS (Austrian Microsystems) in Austria. The change in the magnetic field generates two sequences of pulses. The sensors of the sensor surface record the sequences of pulses. If the first sequence of pulses lies in front of the second sequence of pulses, the circuit 15 will detect that the magnet is being turned towards, for example, the first direction R1 as has been described above. If the magnet is subsequently turned in the opposite direction R2, the second sequence of pulses will lie before the first sequence of pulses. A rotation of the magnet through a complete circle will give 256 pulses to the circuit 15. Each one of these 256 pulses thus corresponds to 360/256 degrees. The length L of the measuring tape 12 can be calculated using the electronic circuit 15 in the housing 9, given the radius of the roller 8, i.e. the distance between the axle A of the roller 8 and the surface 1 of the roller 8, and the angle of rotation a by which the roller 8 has been rotated.

According to one preferred embodiment, a cylinder 2 is pre-sent with its axle B lying parallel with the axle A of the roller 8. The surface 9 of the cylinder 2 lies parallel with the surface 1 of the roller 8 where the distance between the surface of the roller 8 and that of the cylinder 2 corresponds to the thickness of the measuring tape 12, whereby all loops will be placed in direct contact with the surface 1 of the roller 8.

According to one preferred embodiment, the measuring tape 12 is a wire. The measuring tape 12 may be of a material and it may have a form that preferably can be wound up onto and out from the roller 8 easily. Furthermore, it must be possible for all loops to be placed next to each other against the surface 1 of the roller 8.

It is desirable that the diameter of the wire 12 is such that the wire 12 is sufficiently thick to resist any wear and any tensions that may arise in use. Furthermore, it is desirable that the wire 12 is not so thin that there is a risk of the user of the measuring tape 12 cutting himself or herself on the wire. It is therefore preferable that the wire 12 is between 0.4 and 1.0 mm in diameter: the wire is most preferably approximately 0.6 mm in diameter.

During the measurement of the length L of, for example, a log, the said second end of the measuring tape is placed, as described above, against a first end of the log. The measuring tape is subsequently drawn along the log during the measurement. There is a risk throughout the measurement process that the second end of the measuring tape becomes loose from the first end of the log. In this case, the measuring tape 12 flies back in towards the housing 9a, 9b since the spring 10 of the roller 8 retracts the tape by tension. According to one preferred embodiment, therefore, the housing 9a, 9b is provided with a brake 7, through which the measuring tape 12 passes. The brake 7 is arranged to prevent the winding up of the measuring tape 12 onto the roller 8 in the event of winding up that exceeds a pre-determined speed, in order to prevent the second end of the measuring tape 12, for example, hitting the person who is carrying out the measurement.

According to one preferred embodiment, the brake 7 is a centrifugal brake, which means that the wire 12 will be stopped when the speed of winding up exceeds that at which brake components (not shown in the drawing) are displaced outwards in a radial direction due to the centrifugal force. The pre-determined speed is a speed of, for example, 0.3-1.0 m/s, preferably 0.5 m/s. The speed at which the brake 7 is to react can be varied by using brake components of different weights.

A number of embodiments and applications have been described above. It is, however, possible that the measuring tape 12, the roller 8, the brake 7 and the angle sensor 6 can be designed in other suitable manners, without deviating from the basic idea of the invention.

Thus the present invention is not limited to the embodiments described above: it can be varied within the framework defined by the attached patent claims.

The invention claimed is:

1. An electronic measuring tape (11) that comprises a roller (8) on which the measuring tape (12) is arranged to be rolled up onto and rolled out from by the rotation of the roller (8), a first end (3) of the measuring tape (12) being attached to the roller (8), and where the roller (8) is located in a housing (9a, 9b), characterised in that a rolled-up measuring tape (12) is arranged in loops on the roller (8), of which all loops are in direct contact with the surface (1) of the roller (8), in that an angle sensor (6) is arranged at the roller (8) arranged to record an angle of rotation during the rotation of the roller (8), and in that an electronic circuit (15) is arranged to convert the said angle of rotation into a length that corresponds to the length by which the measuring tape (12) has been withdrawn from the said housing (9a, 9b), and in that the measuring tape (12) records absolute values.

2. An electronic measuring tape (11) according to claim 1, characterised in that the circuit (15) is arranged to transfer a withdrawn length of the measuring tape (12) to a hand-held computer.

3. An electronic measuring tape (11) according to claim 2, characterised in that the roller (8) is provided with a spring (10) that is in a resting position when the measuring tape (12) is in a wound-up condition on the roller (8), and which spring (10) is placed under tension when the measuring tape (12) is withdrawn.

4. An electronic measuring tape (11) according to claim 2, characterised in that the angle sensor (6) is a magnetic angle sensor that depends on rotation.

5. An electronic measuring tape (11) according to claim 2, characterised in that the angle sensor (6) is located at the end of an axle (A) around which the roller (8) is rotated.

6. An electronic measuring tape (11) according to claim 2, characterised in that the angle sensor (6) comprises an existing magnetised disk aligned with the said axle (A) that has a north pole and a south pole, respectively, at opposite ends of a diameter, and that comprises a sensor disk lying concentric with the said disk that comprises four sensors that are sensitive to magnetic fields and that are located equidistantly around the periphery of the sensor disk, and in that the electronic circuit (15) is located arranged to receive pulses from the sensor disk, and in that the electronic circuit (15) is arranged to count upwards and downwards when the measuring tape is withdrawn from or wound up into the housing (9a, 9b), respectively, whereby the electronic measuring tape (11) measures absolute values of length.

7. An electronic measuring tape (11) according to claim 1, characterised in that the roller (8) is provided with a spring (10) that is in a resting position when the measuring tape (12) is in a wound-up condition on the roller (8), and which spring (10) is placed under tension when the measuring tape (12) is withdrawn.

8. An electronic measuring tape (11) according to claim 7, characterised in that the angle sensor (6) is a magnetic angle sensor that depends on rotation.

9. An electronic measuring tape (11) according to claim 7, characterised in that the angle sensor (6) is located at the end of an axle (A) around which the roller (8) is rotated.

10. An electronic measuring tape (11) according to claim 7, characterised in that the angle sensor (6) comprises an existing magnetised disk aligned with the said axle (A) that has a north pole and a south pole, respectively, at opposite ends of a diameter, and that comprises a sensor disk lying concentric with the said disk that comprises four sensors that are sensitive to magnetic fields and that are located equidistantly around the periphery of the sensor disk, and in that the electronic circuit (15) is located arranged to receive pulses from the sensor disk, and in that the electronic circuit (15) is arranged to count upwards and downwards when the measuring tape is withdrawn from or wound up into the housing (9a, 9b), respectively, whereby the electronic measuring tape (11) measures absolute values of length.

11. An electronic measuring tape (11) according to claim 1, characterised in that the angle sensor (6) is a magnetic angle sensor that depends on rotation.

12. An electronic measuring tape (11) according to claim 11, characterised in that the angle sensor (6) is located at the end of an axle (A) around which the roller (8) is rotated.

13. An electronic measuring tape (11) according to claim 11, characterised in that the angle sensor (6) comprises an existing magnetised disk aligned with the said axle (A) that has a north pole and a south pole, respectively, at opposite ends of a diameter, and that comprises a sensor disk lying concentric with the said disk that comprises four sensors that are sensitive to magnetic fields and that are located equidistantly around the periphery of the sensor disk, and in that the electronic circuit (15) is located arranged to receive pulses from the sensor disk, and in that the electronic circuit (15) is arranged to count upwards and downwards when the measuring tape is withdrawn from or wound up into the housing (9a, 9b), respectively, whereby the electronic measuring tape (11) measures absolute values of length.

14. An electronic measuring tape (11) according to claim 1, characterised in that the angle sensor (6) is located at the end of an axle (A) around which the roller (8) is rotated.

15. An electronic measuring tape (11) according to claim 14, characterised in that the angle sensor (6) comprises an existing magnetised disk aligned with the said axle (A) that has a north pole and a south pole, respectively, at opposite ends of a diameter, and that comprises a sensor disk lying concentric with the said disk that comprises four sensors that are sensitive to magnetic fields and that are located equidistantly around the periphery of the sensor disk, and in that the electronic circuit (15) is located arranged to receive pulses from the sensor disk, and in that the electronic circuit (15) is arranged to count upwards and downwards when the measuring tape is withdrawn from or wound up into the housing (9a, 9b), respectively, whereby the electronic measuring tape (11) measures absolute values of length.

16. An electronic measuring tape (11) according to claim 1, characterised in that the angle sensor (6) comprises an existing magnetised disk aligned with the said axle (A) that has a north pole and a south pole, respectively, at opposite ends of a diameter, and that comprises a sensor disk lying concentric with the said disk that comprises four sensors that are sensitive to magnetic fields and that are located equidistantly around the periphery of the sensor disk, and in that the electronic circuit (15) is located arranged to receive pulses from the sensor disk, and in that the electronic circuit (15) is arranged to count upwards and downwards when the measuring tape is withdrawn from or wound up into the housing (9a, 9b), respectively, whereby the electronic measuring tape (11) measures absolute values of length.

17. An electronic measuring tape (11) according to claim 1, characterised in that a cylinder (2), the axle of which (B) lies parallel with the axle (A) of the roller (8), and in that the surface (9) of the cylinder (2) lies parallel with the surface (1) of the roller (8) where the distance between the surface of the roller (8) and that of the cylinder (2) corresponds to the thickness of the measuring tape (12).

18. An electronic measuring tape (11) according to claim 1, characterised in that the measuring tape (12) is a wire.

19. An electronic measuring tape (11) according to claim 18, characterised in that the wire (12) has a diameter that lies between 0.4 and 1.0 mm, preferably 0.6 mm.

20. An electronic measuring tape according to claim 1, characterised in that the housing (9a, 9b) is provided with a brake (7) through which the measuring tape (12) runs, and in that the brake (7) is arranged to stop the winding up of the measuring tape (12) onto the roller (8) when the winding-up exceeds a pre-determined speed.

* * * * *